United States Patent [19]

Kirigakubo et al.

[11] Patent Number: 4,821,673
[45] Date of Patent: Apr. 18, 1989

[54] APPLICATOR ROBOT AND APPARATUS HAVING MEMBER FOR PICKING UP AND TRANSPORTING WORKPIECE

[75] Inventors: Minoru Kirigakubo, Sakado; Hitoshi Nakazawa, Sayama; Kyuya Yamazaki, Hidaki, all of Japan

[73] Assignee: Honda Giken Kogyo Kabushiki Kaisha, Tokyo, Japan

[21] Appl. No.: 920,549

[22] Filed: Oct. 20, 1986

[30] Foreign Application Priority Data

Oct. 21, 1985 [JP] Japan ................................ 60-234697
Oct. 21, 1985 [JP] Japan ................................ 60-234699
Nov. 8, 1985 [JP] Japan ................................ 60-250016

[51] Int. Cl.$^4$ ............................................. B05B 13/02
[52] U.S. Cl. ..................................... 118/319; 118/323; 118/324; 118/500; 118/503; 118/697; 118/704; 118/313; 198/346.2; 198/413; 901/7; 901/8; 901/43; 239/69; 239/753; 239/587
[58] Field of Search ............... 118/319, 323, 326, 500, 118/313, 704; 901/7, 8, 43; 198/346.2, 463.3, 468.2, 413; 239/69, 752, 753, 587

[56] References Cited

U.S. PATENT DOCUMENTS

| | | | |
|---|---|---|---|
| 3,306,471 | 2/1967 | Devol | 901/7 X |
| 3,323,632 | 6/1967 | Modder et al. | 198/413 |
| 3,709,190 | 1/1973 | Von Gottberg et al. | 901/7 X |
| 4,129,092 | 12/1978 | Wiggins | 118/326 X |
| 4,342,535 | 8/1982 | Bartlett et al. | 414/744 A |
| 4,423,999 | 1/1984 | Choly | 118/500 X |
| 4,498,414 | 2/1985 | Kiba et al. | 118/323 X |
| 4,552,506 | 11/1985 | Cummins et al. | 901/15 X |
| 4,561,592 | 12/1985 | Fender et al. | 239/587 |
| 4,573,862 | 3/1986 | Anderson | 198/468.2 X |
| 4,589,184 | 5/1986 | Asano et al. | 901/7 X |
| 4,693,664 | 9/1987 | Schweiker | 901/43 X |

FOREIGN PATENT DOCUMENTS 1393349  5/1975  United Kingdom ................ 239/587

Primary Examiner—Shrive Beck
Assistant Examiner—Alain Bashore
Attorney, Agent, or Firm—Armstrong, Nikaido, Marmelstein & Kubovcik

[57] ABSTRACT

An applying robot which is disclosed herein comprises a movable arm having an applying gun and reciprocatingly movable at least between a work carry-in position and an applying position; and a work transporting hanger member mounted on the movable arm for engagement with and disengagement from a work in the individual positions.

14 Claims, 12 Drawing Sheets

APPLICATOR ROBOT AND APPARATUS HAVING MEMBER FOR PICKING UP AND TRANSPORTING WORKPIECE

BACKGROUND OF THE INVENTION

1. Field of the Invention

The present invention relates to an applying robot and an applying apparatus used for applying a coating, an adhesive or the like to a work.

1. Description of the Prior Art

There is known an applying robot of such a type in which the opening and closing of a door can be performed in addition to an applying operation, as disclosed in Japanese Patent Application Laid-open No. 128061/84, but such an applying robot having a work transfer function is not known.

Therefore, a work transport system must be disposed between a work carry-in position and a work carry-out position, resulting not only in an increased cost of equipment but also in a complicated construction as a whole, and further in a large size.

In addition, such applying robot includes a single applying gun on a movable wrist at the fore end of a movable arm (see the published specification of the aforesaid Japanese Patent Application).

In carrying out the applying operation on an application surface of a work by the applying gun, if the spraying direction of the applying gun is turned, for example, to a direction substantially normal to a horizontal application surface, the resulting application thickness is larger than that provided when the spraying direction is turned to an oblique direction with respect to the application surface. With the spraying direction oblique with respect the application surface, the oblique spraying results in that the application thickness at the proximate portion closer to the gun is larger than that at the distal portion far from the gun, and event if the reapplication is conducted, the resulting application thickness may not be uniform. Such a problem can be overcome with the spraying in a direction substantially normal to the application surface. Accordingly, in order to provide an improvement in applying efficiency and a uniform application thickness over the entire application surface, it is necessary to control the spraying direction of the applying gun to be substantially normal to the application surface.

When the application surface of a work has complex rugged portions and a single applying gun is used as in the prior art, however, it is very difficult to control the applying gun so that the spraying direction thereof may be substantially normal to all the rugged portions of the application surface, because the movement of the wrist is complicated. In addition, the amount of movable wrist moved is increased during spraying and during interruption of spraying attendant upon the change of applying position, resulting in a decrease in applying efficiency.

In performing the applying operation on a work by the applying robot, it is desirable to maintain the work in the raised-up state in order to provide the efficient movement of the movable arm including the applying gun. When the work is transported in and out in the raised-up state, however, a member is required for maintaining the work in the raised-up state during transporting, the wider carry-in and carry-out spaces are also required to prevent the interference of the work with other parts.

SUMMARY OF THE INVENTION

It is an object of the present invention to provide an applying robot of a type as described above, which includes a work transport function to dispense with a work transport system at least between a work carry-in position and an applying position.

It is another object of the present invention to provide such an applying robot of a good applying efficiency, wherein the spraying direction of an applying gun can be turned to a direction substantially normal to an application surface of a work, with the amount of movement of a movable wrist being limited to a minimum.

It is a further object of the present invention to provide an applying apparatus of a type as described above, wherein a work can be transported in and out in the fallendown state and during the applying treatment, the work can be maintained in the raised-up state.

To accomplish the above objects, according to the present invention there is provided an applying robot comprising a movable arm having an applying gun and reciprocatingly movable at least between a work carry-in position and an applying position, and a work transporting hanger member mounted on the movable arm for engagement with and disengagement from a work in the individual positions.

In addition, according to the present invention, there is provided an applying robot, wherein the hanger member is a hook which includes a first engaging portion adapted to engage the corner between the upper and inner surface in a U-shaped groove provided along the upper edge of the work, and a second engaging portion adapted to engage the lower and inner surface of the U-shaped groove.

In accordance with the present invention, there is also provided an applying robot, therein a movable wrist on the fore end of the movable arm includes a plurality of applying guns fixedly mounted thereon at a predetermined mounting angle so that the spraying directions may be different from each other, and the mounting angle is set such that with the movement of the movable arm, the spraying direction of either one of the applying guns may be substantially normal to a desired application surface of the work with a minimum amount of movement of the movable wrist.

Further, in accordance with the present invention, there is provided an applying robot comprising a movable arm having an applying gun and reciprocatingly movable at least between a work carry-in position and an applying position, a work transporting hanger member mounted on the movable arm for engagement with and disengagement from a work in the individual positions, and an urging member mounted on the movable arm for clamping the work in cooperation with the hanger member during transporting the work by the hanger member.

Still further, according to the present invention, there is provided an applying robot, comprising a movable arm having an applying gun and reciprocatingly movable between a work carry-in position and an applying position as well as between the applying position and a work carry-out position, and a work transporting hanger member mounted on the movable arm for engagement with and disengagement from a work in the individual positions.

Additionally, according to the present invention, there is provided an applying robot comprising a movable arm having an applying gun and reciprocatingly movable between a work carry-in position and an applying position as well as between the applying position and a work carry-out position, a work transporting hanger member mounted on the movable arm for engagement with and disengagement from a work in the individual positions, and an urging member mounted on the movable arm for clamping the work in cooperation with the hanger member during transporting the work by the hanger member.

Further, according to the present invention, there is provided an applying apparatus comprising a carry-in conveyer for transporting a work in the fallen-down state to a work carry-in position, a first operating member disposed in the work carry in position for raising u the work after transported on the carry-in conveyer, an applying robot for handing and transporting the work in the raised-up state from the work carry-in position to an applying position and for hanging and transporting the raised-up work in the applying position in this state to a work carry-out position, a carry out conveyer for transporting the work hung and transferred by the applying robot from the work carry-out position; and a second operating member disposed in the work carry out position for maintaining the work in the raised-up state on the carry out conveyer when the hanging of the work by the applying robot is released and for providing the falling-down of the work onto the carry-out conveyer after the hanging of the work has been released.

Yet further, according to the present invention, there is provided an applying apparatus comprising a carry-in conveyer for transporting an unapplied work to a work carry-in position, a carry-out conveyer for transporting the applied work from a work carry-out position, an applying robot turnable between the work carry in position and an applying position to hang and transport the work from the work carry-in position to the applying position and a work transfer machine linearly movable between the applying position and the work carry-out position to transfer the applied work from the applying position to the work carry-out position.

With the above robot, the work is hung by the hanger member of the movable arm including the applying gun and transported between the work carry in position and the applying position as well as between the applying position and the work carry out position. Therefore, it is unnecessary, to mount a work transport system between the individual positions as in the prior art, thereby making it possible to reduce the cost of equipment and provide a simplification of construction and a reduction in size.

In addition, the first engaging portion of the hook may engage the corner between the upper and inner surface and the bottom surface of the U-shaped groove in the work, and the second engaging portion of the hook may engage the lower and inner surface of the groove in the work, so that the work may be reliably hung by the hook and the work cannot be fallen off the hook during the rapid movement of the movable arm. In this case, if the urging member for clamping the work in cooperation with the hanger member is mounted on the movable arm, the falling-off of the work can be further reliably prevented.

Additionally, with the aforesaid applying apparatus, the spraying direction of either one of the applying guns can be turned to a direction substantially normal to a desired application surface by the minimum movement of the movable wrist with the shifting of the applying position by the movable arm, thereby enabling the applying operation to be efficiently conducted with the simplified control of the movable wrist.

Further, with the aforesaid applying apparatus, the work is transported in and out and hence, any member is unnecessary for maintaining the work in the raised-up state during transporting, and the carry-in and carry-out spaces can be smaller. Moreover, because each of the first and second operating members for providing the raising-up and falling down of the work is an expandable rod or a stingable arm, the construction thereof is simple.

Still further, with the applying apparatus, the work hanging and transferring function is possessed by the applying robot, so that an unapplied work is hung and transferred by the applying robot from the work carry-in position to the applying position, and the applied work is transferred by the work transfer machine from the applying position to the work carry-out position. Therefore, only one work transfer machine may be used, thereby making it possible to reduce the cost of equipment and provide a simplification of construction and a reduction in size.

Moreover, because the transferring of the work by the applying robot is only between the work carry-in position and the applying position, the time required for transferring the work by the applying robot is relatively short and therefore, it is possible to suppress the reduction in applying efficiency to the utmost.

The above and other objects, features and advantages of the invention will become apparent from reading of the following description of the preferred embodiments with reference to the accompanying drawings.

BRIEF DESCRIPTION OF THE DRAWINGS

FIGS. 1 to 6 illustrate one embodiment of an applying apparatus comprising an applying robot, wherein FIG. 1 is a side view of the applying robot;

FIG. 2 is an enlarged view taken in the direction of the arrow II of FIG. 1;

FIG. 3 is a plan view of the whole of the applying apparatus;

FIG. 4 is a perspective view of a hanger member;

FIG. 5 is a front view illustrating a work handing operation in a work carry-in position; and FIG. 6 is a front view illustrating a work placing operation in a work carry-out position:

FIGS. 7 to 12 illustrate another robot and an applying operation, wherein

FIG. 7 is a side view of the applying robot;

FIG. 8 is an enlarged side view of the attachment of applying guns;

FIG. 9 is a view taken in the direction of the arrow IX of FIG. 8;

FIG. 10 is a view taken in the direction of the arrow X of FIG. 8; and

FIGS. 11 and 12 are illustrations for explaining the applying operation; and

FIG. 13 is a plan view of the whole of the applying apparatus;

FIG. 14 is a sectional view taken along the line XIV-XIV of FIG. 13; and

FIG. 15 is a sectional view taken along the line XV-XV of FIG. 13;

DESCRIPTION OF THE PREFERRED EMBODIMENTS

Figure 1:
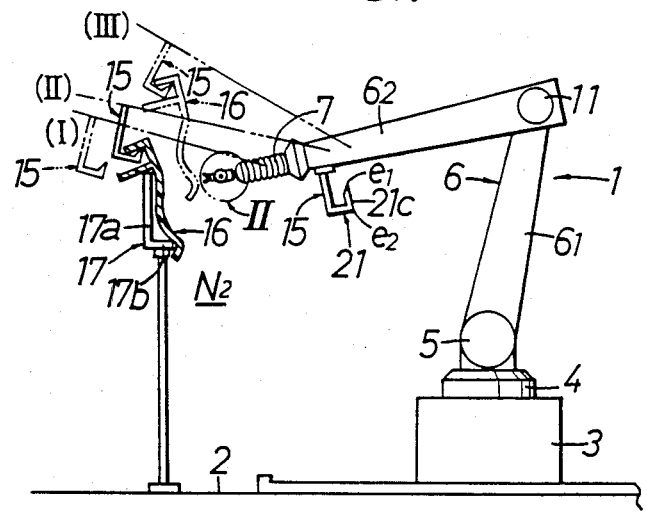
Figure 2:
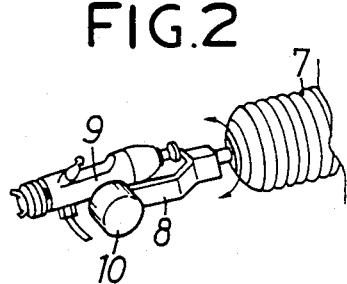

FIGS. 1 to 6 illustrate one embodiment of an applying apparatus provided with an applying robot.

The applying robot is mounted on a fixing base 3 stationarily mounted on a floor 2. The applying robot 1 comprises a turning stand 4 carried on the fixing base 3 for turning movement about an axis vertical to the floor 2, a movable arm 6 connected through a pivot 5 to the turning stand 4 and swingable within a plane including that axis, and a movable wrist mounted on the leading end of the movable arm 6 for turning movement about the axis of the movable arm 6. As clearly shown in FIG. 2, a bracket 8 mounted in protrusion on the movable wrist 7 to extend in the axial direction of the movable wrist 7, and an applying gun 9 is attached to the bracket 8 through a tilting mechanism 10 and is tiltable about an axis perpendicular to the axis of the movable arm.

Figure 3:
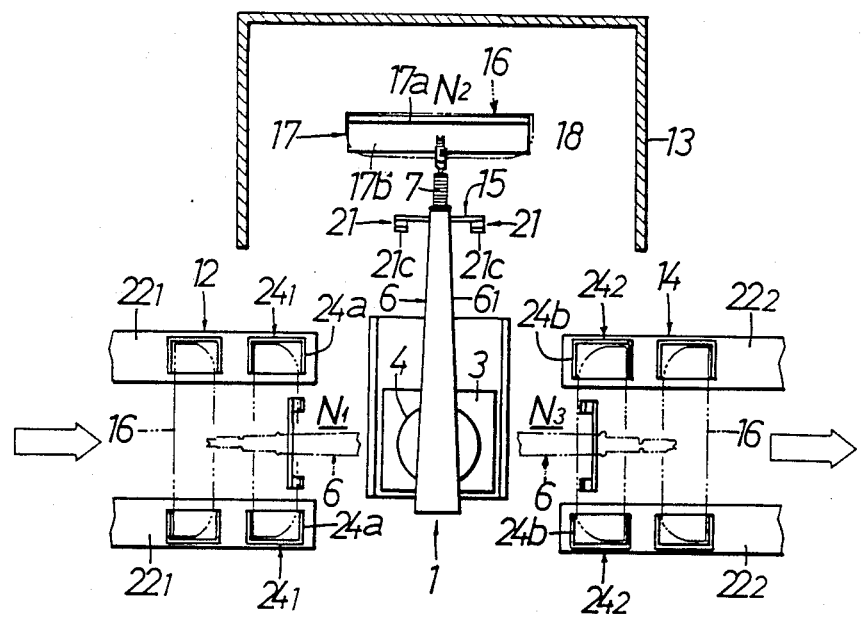
Figure 4:
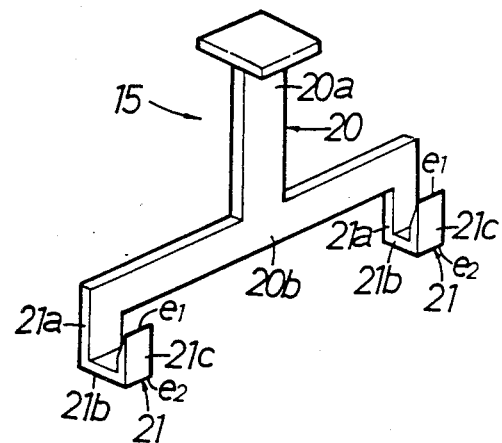

The movable arm 6 consists of an upper arm portion 61 close to the turning stand 4 and a front arm portion 62 close to the applying gun 9, these arm portions 61 and 62 being interconnected through a pivot 11 for flexing movement within the aforesaid plane. As shown in FIG. 3, the movable arm 6 is also reciprocatingly movable between a work carry-in position N1 at which a carry-in conveyer 12 is present and an intermediate applying position N2 at which an applying booth 13 is present, as well as between the applying position and a work carry-out position N3 at which a carry-out conveyer 14 is present.

A work transporting hanger member 18 is attached to the undersurface at the leading end of the front arm portion 62. As clearly shown in FIG. 4, the hanger member 15 includes an inverse T-shaped mounting portion 20 and two L-shaped hooks 21 integral with the mounting portion 20. A vertical portion 20a of the mounting portion 20 is mounted on the undersurface of the front arm portion 6₂ to depend therefrom, and the two hooks 21 are disposed on the opposite ends of a horizontal portion 20b, respectively. Each of the hooks 21 is comprised of a base end 21a provided on the horizontal portion 20b to depend therefrom, an intermediate portion 21b bended substantially squarely from the base end 21a, and a leading end 21c bended substantially squarely from the intermediate portion 21b in an opposed relation to the base end 21a. The tip of the leading end 21c is sharply formed to provide a blade point which functions as a first engaging portion e1 relative to a work. Also, the corner between the outer surfaces of the leading end 21c and the intermediate portion 21b functions as a second engaging portion e2 relative to the work.

A work 16 of a synthetic resin has a plate-like first bend portion bended substantially squarely toward a back surface b of an application surface a at its upper edge and a plate-like second bend portion 16b bended at an obtuse angle toward the back surface b at its lower edge, and further has a plate-like reinforcing portion 16c provided on the back surface b to project substantially in parallel to the first bend portion 16a. A U-shaped groove G extending along the upper edge of the work 16 is defined by the first bend portion 16a, the reinforcing portion 16c and the back surface b.

Figure 5:
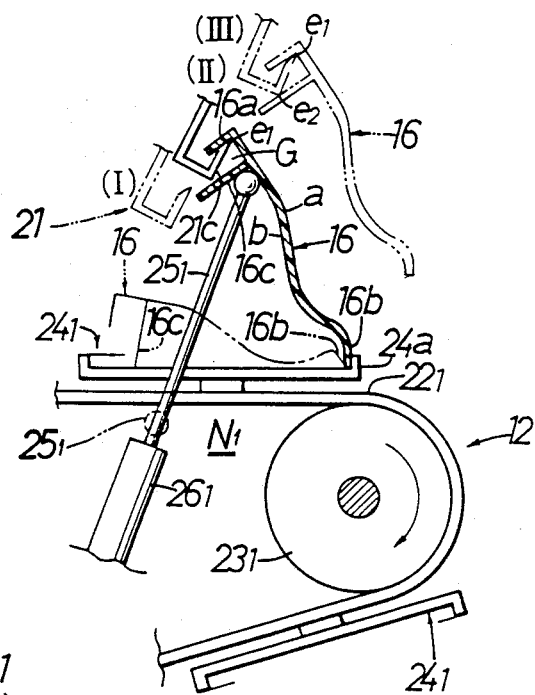

As shown in FIGS. 3 and 5, the carry-in conveyer 12 includes a pair of parallel endless belts $22_1$ which are passed around a plurality of rollers $23_1$ (only one is shown in the figures). A number of trays $24_1$ each permitting a work 16 to be placed thereon are attached to the two endless belts $22_1$ at predetermined distances, and any one tray $24_1$ on one of the endless belts $22_1$ and the opposed tray $24_1$ on the other endless belt $22_1$ are provided in one set for transfer of a work 16. Each set of trays $24_1$ form a planar rectangular shape, and a bend edge 24a is formed on three sides excluding the opposed side.

As shown in FIG. 5, a first expandable rod $25_1$ as a first operating member is disposed between both of the endless belts $22_1$ in the work carry in position N1 to provide the raising-up of a work 16 transported in a fallen-down state. The reference character $26_1$ is a hydraulic or pneumatic first cylinder for operating the first expandable rod $25_1$.

Figure 6:
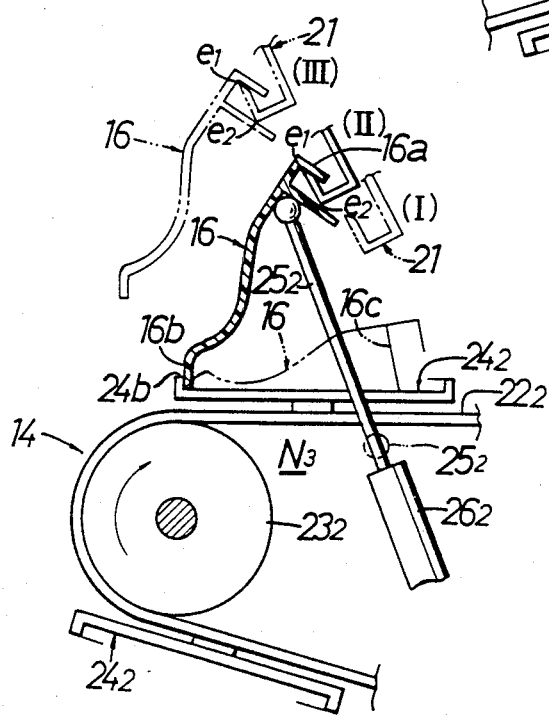
Figure 7:
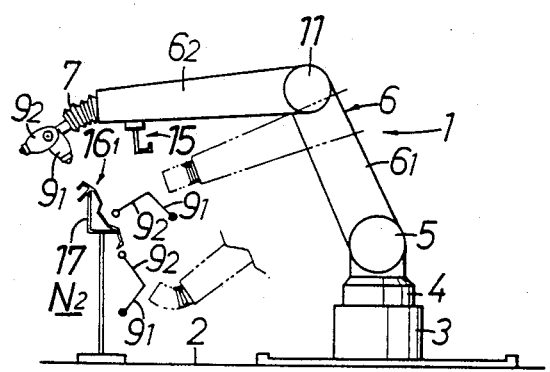

In addition, as shown in FIGS. 3 and 6, the carry out conveyer 14 also includes a pair of parallel endless belts $22_2$ which are passed around a plurality of rollers $23_2$ (only one is shown in figures). A number of trays $24_2$ each permitting a work 16 to be placed thereon are attached to the two endless belts $22_2$ at predetermined distances, and any one tray $24_1$ on one of the endless belts $22_2$ and the opposed tray $24_2$ on the other endless belt $22_2$ are provided in one set for transfer of a work 16. Each set of trays $24_2$ form a planar rectangular shape, and a bend edge 24b is formed on three sides excluding the opposed side.

As shown in FIG. 6, a second expandable rod $25_2$ as a second operating member is disposed between both of the endless belts $22_2$ in the work carry out position N3 in order to place a raised-up work 16 intactly onto the carry-out conveyer 14 and then fall-down the work 16. The reference character $26_2$ is a hydraulic or pneumatic second cylinder for operating the second expandable rod $25_2$.

As clearly shown in FIG. 1, a support 17 is mounted in the applying booth 13 and formed into a substantially L-shaped configuration by a vertical portion 17a and a horizontal portion 17b, so that during an applying operation, a work 16 may be placed in a raised-up state onto the support 17.

Description will now be made of an applying operation.

As show by broken lines in FIGS. 3 and 5, a work 16 is placed onto one set of the opposed trays $24_1$ to extend therebetween with each of its opposite ends lying on each of these trays $24_1$ and is then transported in a fallen-down state to the work carry in position N1 by the carry-in conveyer 12. In the fallen-down state, the fore ends of the second bend portion 16b and reinforcing portion 16c of the work 16 are in abutment against the trays $24_1$. The first expandable rod $25_1$ is in retraction as shown by a broken line in FIG. 5, with the fore end thereof lying below the work 16, whereby the further transporting of the work 16 may not be prevented.

When the work 16 has reached the work carry in position N1, the carry-in conveyer 12 is deactivated, and the leading end of the first expandable rod $25_1$ is opposed to the vicinity of the reinforcing portion 16c of the back surface b between the second bend portion 16b and reinforcing portion 16c of the work 16.

The first cylinder $26_1$ is actuated to expand the first rod $25_1$ as shown by a solid line in FIG. 5, thereby allowing the end edge of the second bend portion 16b to abut against the bended edge 24a of the tray $24_1$, and the work 16 is turned about such abuting point in the clockwise direction in FIG. 5 and raised up. In the raised-up state of the work 16, the leading end of the first expandable rod $25_1$ abuts against the corner between the undersurface of the reinforcing portion 16c and the back surface b.

The movable arm 6 is swung to the work carry-in position N1 to expand, thereby allowing the leading ends 21c of the both hooks 21 on the hanger member 15 to be located in the vicinity of the opening of the groove G. As shown in full line at (II) in FIG. 5, the movable arm 6 is retracted to loosely insert the leading end 21c into the groove G of the work 16 and bring the first engaging portion e1 of the leading end 21c into engagement with the corner between the upper and inner surface and the bottom surface of the groove G. As shown at in phantom line (III) in FIG. 5, the movable arm 6 is further retracted to hang up the work 16 through both the hooks 21. This hanging-up permits the work 16 to swing by the self weight about the aforesaid corner in the clockwise direction in FIG. 5 and with this swinging, the lower and inner surface of the groove G is engaged with the second engaging portion e2, while the first engaging portion e1 bites into the aforesaid corner.

Such biting engagement of the first engaging portion e1 and the engagement of the second engaging portion e2 ensure that the work 16 is hung by the hanger member 15.

The movable arm 6 is swung to the applying position N2, and the work 16 is placed in a raised-up state on the support 17 in the sequence of the states (III), (II) and (I) of FIG. 1 wherein the states. (I) to (III) correspond to the states (I) to (III) of FIG. 5, respectively. In this placed state, the vertical portion 17a of the support 17 engages the corner between the undersurface of the reinforcing portion 16c and the back surface b of the work 16, and the second bend portion 16b engages the horizontal portion 17b of the support 17. Using the applying gun 9, the applying treatment is performed on the application surface a of the work 16.

As in the work hanging operation in the work carry-in position, the work 16 is hung by the hanger member 15 and the movable arm 6 ia swung to the work carry-out position in the sequence of the states (I), (II) and (III) shown in FIG. 1.

At this time, the carry out conveyer 14 is in deactivation, and as shown in FIG. 6, the second expandable rod $25_2$ has been expanded with the leading end thereof lying above the tray $24_2$ by the actuation of the second cylinder $26_2$. This expanded state of the second expandable rod $25_2$ is in a relationship of bilateral symmetry with the expanded state of the first expandable rod $25_1$ when the work 16 is hung in the work carry-in position.

The work 16 is placed in a raised-up state onto one set of the opposed trays $24_2$ in the sequence of the states (III), (II) and (I) of FIG. 6 wherein the states (I) to (III) correspond to the states (I) to (III) of FIG. 5, respectively. In this raised-up state of the work 16, the leading end of the second expandable rod $25_2$ abuts against the corner between the undersurface of the reinforcing portion 16c and the back surface b, and the end edge of the second bend portion 16b abuts against the bended edge 24b of the tray $24_2$.

The second cylinder $26_2$ is actuated to retract the second expandable rod $25_2$ until the leading end of the rod $25_2$ is located below the tray $24_2$, and the work 16 is turned about such abuting point of the second bend portion 16b against the bended edge 24b in the clockwise direction of FIG. 6 into a fallen-down state, and thus placed onto the one set of opposed trays $24_2$ in the same fallen-down state as at the carry-in of the work 16.

The work 16 is transported to a drying furnace or the like by the carry-out conveyer 14, while the movable arm 6 is swung via the applying position N2 to the work carry-in position N1 and ready for the next application to a work.

A component having a large-sized complex configuration such as a instrument panel for a vehicle is fabricated by adhesively bonding a composite sheet consisting of a skin layer of polyvinyl chloride and a cushion layer of foamed polypropylene affixed to the skin layer to a core of ABS resin, and the above-described robot 1 is effective for the application of an adhesive onto such core, but may be, of course, provided for coating.

Figure 8:
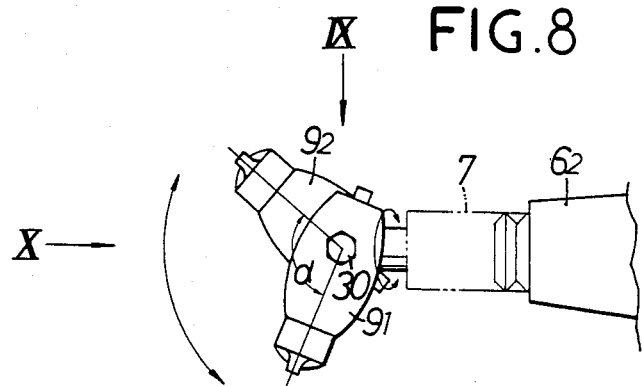
Figure 9:
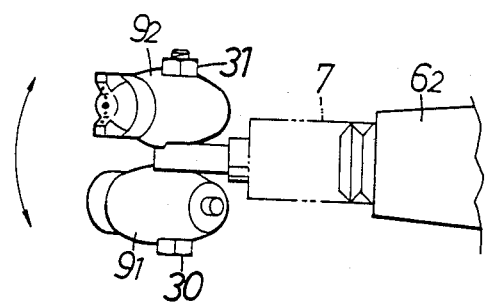
Figure 10:
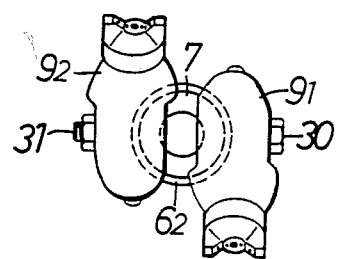

FIGS. 7 to 12 illustrate another embodiment of an applying robot 1 according to the present invention. The applying robot has a movable wrist 7 which is constructed to be turnable about the axis of the front arm portion $6_2$ and also swingable about an axis perpendicular to the sheet surface, as shown in FIG. 8 and further to be swingable within a plane perpendicular to the sheet surface of the FIG. 8, as shown in FIG. 9, and thus, the movable wrist 7 has a flexibility similar to that of a human's wrist.

As clearly shown in FIGS. 8 and 9, a plurality of (two in the illustrated embodiment) first and second applying guns $9_1$ and $9_2$ are mounted on the fore end of the movable wrist 7 for adjustment in mounting angle through a through bolt 30 and a nut 31. In the illustrated embodiment, the mounting angle of the first and second applying guns $9_1$ and $9_2$ is set in a range of 100° to 110° and therefore, the spraying directions of the first and second applying guns $9_1$ and $9_2$ are different by the mounting angle.

Figure 11:
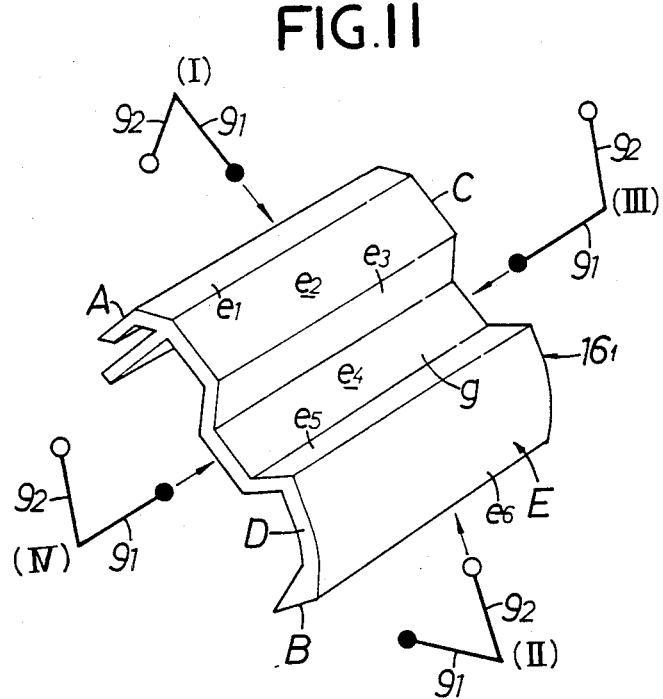
Figure 12:
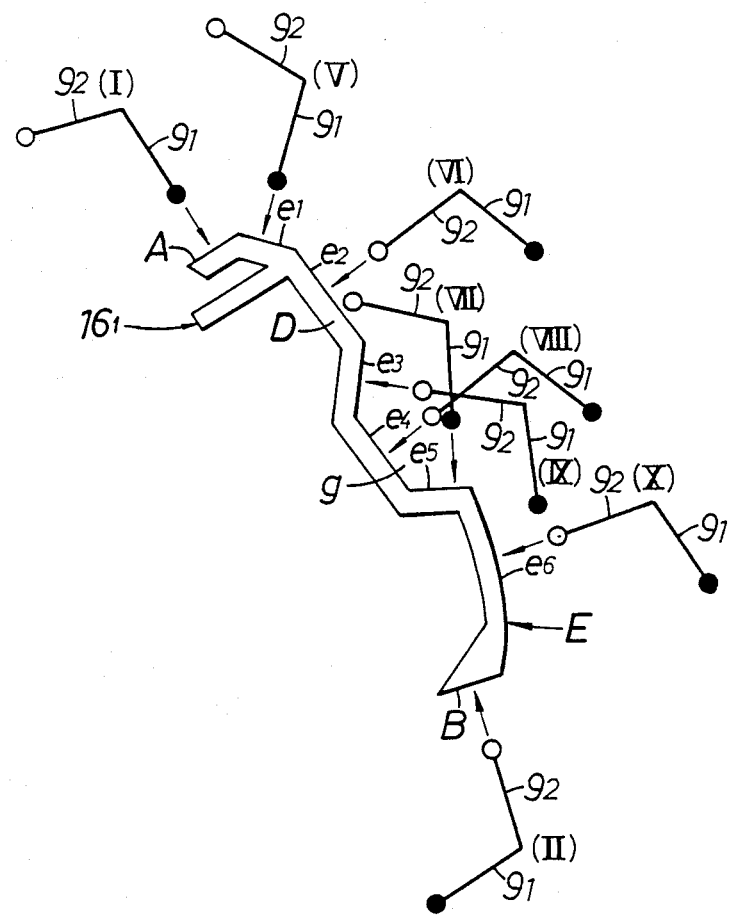

Description will not be made of the operation of applying an adhesive onto a work $16_1$ using the above-mentioned applying robot 1 with reference to FIGS. 11 and 12.

A support 17 is disposed in front of the applying robot 1 as in the previously described embodiment, and a work $16_1$ is placed in the raised-up state onto the support 17.

The application of an adhesive onto the work $16_1$ is carried out for application surfaces in order of the upper surface A→the lower surface B→the right side surface C→left side surface D→the front surface E by use of the first and second applying guns $9_1$ and $9_2$ with the spraying directions thereof turned substantially perpendicularly to these application surfaces, the application of the adhesive onto the front surface E being conducted for each of the recessed and protruded portions.

As seen in FIGS. 11 and 12, the adhesive is applied onto the upper surface A of the work $16_1$ in the state (I) by the first applying gun $9_1$.

Both of the applying guns $9_1$ and 9 are moved to the below of the work $16_1$ by the movable arm 6 and the movable wrist 77 is swung, thereupon the adhesive is applied onto the lower surface B of the work 16 in the state (II) by the second gun $9_2$.

Both of the applying guns $9_1$ and $9_2$ are moved to the right side of the work $16_1$ by the movable arm 6, and the movable wrist 7 is swung and turned, thereupon the adhesive is applied onto the right side surface C of the work $16_1$ in the state (III) by the first applying gun $9_1$.

Both of the applying guns $9_1$ and $9_2$ are moved to the left side of the work $16_1$ by the movable arm 6, and the movable wrist 7 is swung and turned, thereupon the adhesive is applied onto the left side surface D of the work $16_1$ in the state (IV) by the first applying gun $9_1$.

Both of the applying guns $9_1$ and $9_2$ are moved to the above of the front surface E of the work $16_1$ by the movable arm 6, and the movable wrist is swung and turned whereupon the adhesive is applied onto the upper inclined surface e1 of the front surface E of the work $16_1$ in the state (V) shown in FIG. 12 by the first applying gun $9_1$.

Both of the applying guns $9_1$ and $9_2$ are moved downwardly by the movable arm 6, and the movable wrist 7 is swung and turned, thereupon the adhesive is applied onto the intermediate inclined surface e2 of the front surface E of the work $16_1$ in the state (VI) shown in FIG. 12 by the second applying gun $9_2$.

Both of the applying guns $9_1$ and $9_2$ are moved downwardly by the movable arm 6, and the movable wrist 7 is swung and turned, thereupon the adhesive is applied onto the lower and inner surface e5 of the groove G in the front surface E of the work $16_1$ in the state (VII) shown in FIG. 12 by the first applying gun $9_1$.

Both of the applying guns $9_1$ and $9_2$ are swung downwardly by the movable arm 6 and the movable wrist 7 is swung thereupon the adhesive is applied onto the bottom surface e4 of the groove G in the front surface E of the work $16_1$ in the state (VIII) shown in FIG. 12 by the second applying gun $9_2$.

Both of the applying guns $9_1$ and $9_2$ are moved downwardly by the movable arm 6 and the movable wrist 7 is swung, thereupon the adhesive is applied onto the upper and inner surface e3 of the groove G in the work $16_1$ in the state (IX) shown in FIG. 12 by the second applying gun $9_2$.

Both of the applying guns $9_1$ and $9_2$ are moved downwardly by the movable arm 6 and the movable wrist 7 is swung, thereupon the adhesive is applied onto the lower inclined surface e4 of the groove G in the front surface E of the work $16_1$ in the state (X) shown in FIG. 12 by the second applying gun $9_2$.

As described above, the specification of the mounting angle of the first and second applying guns $9_1$ and $9_2$ enables either one of the first and second applying guns $9_1$ and $9_2$ closer to a desired application surface of the work $16_1$ to be swung and/or turned with the shifting of the applying position by the movable arm 6 to turn the spraying direction of either one of the applying guns $9_1$ and $9_2$ to a direction substantially normal to the desired application surface, thereby making it possible to suppress the amount of movable wrist 7 moved at a minimum.

It should be noted that three or more applying guns can be employed.

Figure 13:
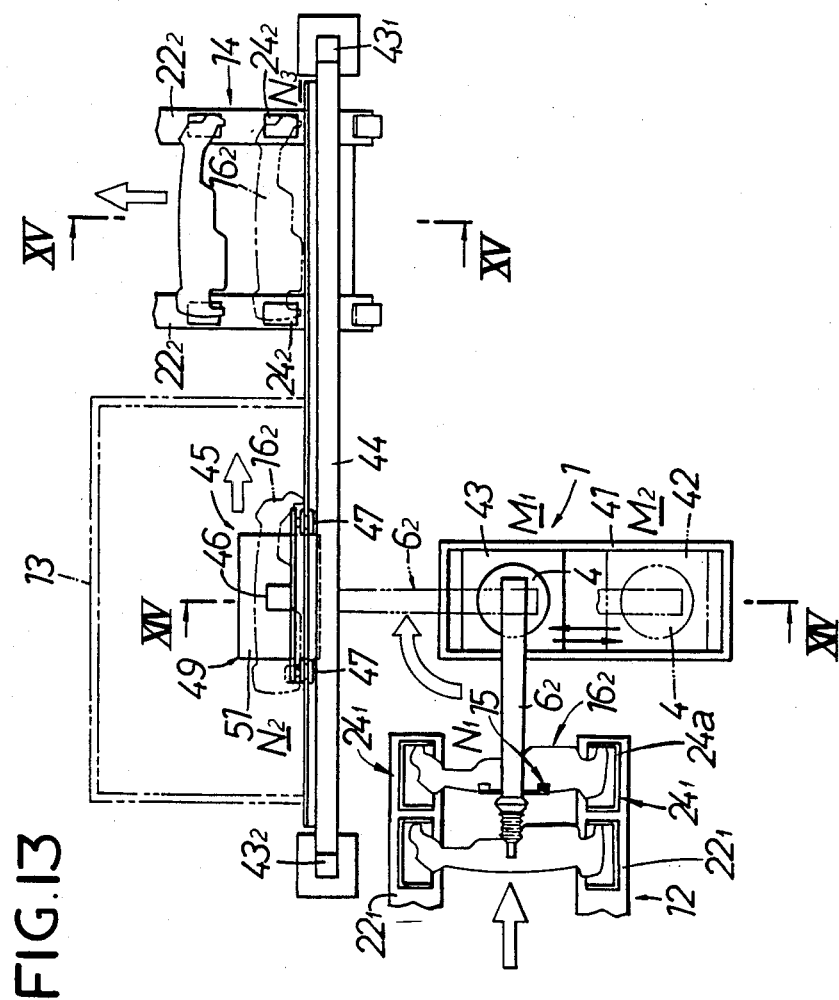
FIGS. 13 to 15 illustrate another applying apparatus, herein
Figure 14:
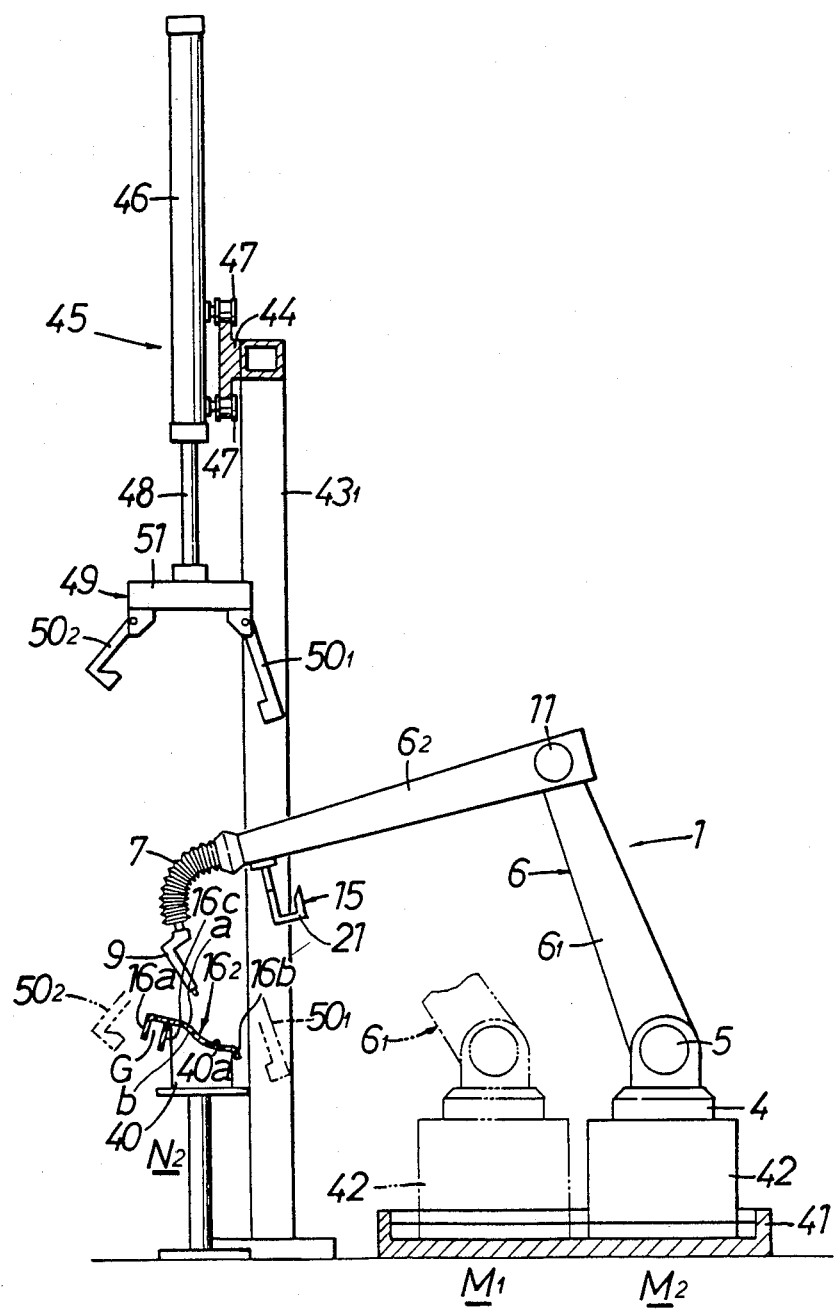
Figure 15:
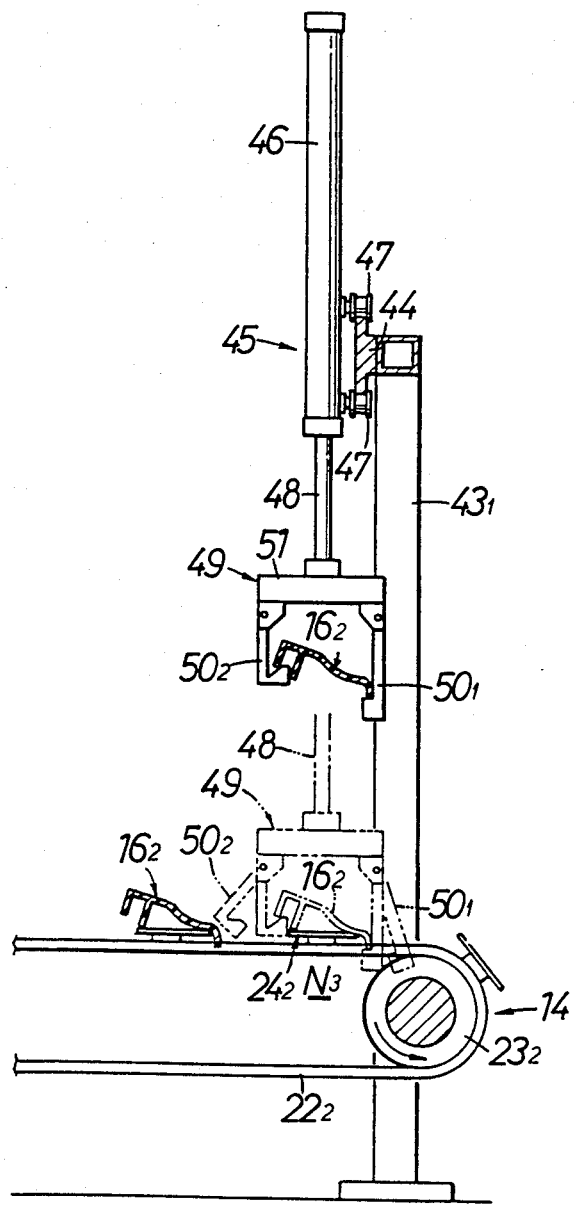

FIGS. 13 to 15 illustrate a further embodiment of an applying apparatus.

Referring to FIG. 13, there are shown a carry-in conveyer 12 for transporting an unapplied work $16_2$ into a work carry-in position N1 and a carry-out conveyer 14 for transporting an applied work 16 out of a work carry-out position N3, these conveyers being arranged at a predetermined distance spaced from each other and with the transport directions deviated in phase by approximately 90°.

An applying position N2 is established side by side with the work carry out position N3 and close to the work carry-in position N1, so that the applying position N2 and the work carry out position N3 may be on one straight line substantially perpendicular to the work transport direction of the carry out conveyer 14.

The structure of the carry in conveyer 12 is substantially identical with those shown in FIGS. 3 and 5, and an expandable rod (no shown) similar to those described above is mounted in the work carry in position N1.

As shown in FIGS. 13 and 14, a work placing stand 40 is disposed in the applying position N2, and an applying robot 1 having the substantially same structure as that described above is disposed in an opposed relation to the placing stand 40. The placing stand 40 has a work placing surface 40a which is inclined to facilitate the application in such a state that a work $16_2$ is placed on that placing surface 40a with its portion close to the applying robot 1 down. The width of the work placing surface 40a is less than that of the work $16_2$. A stational guide rail 41 is placed in an opposed relation to the placing stand 40 so that the guiding direction may be substantially perpendicular to the aforesaid straight line on which the applying position N2 and the work carry-out position N3 lie, and a slide 42 is slidably mounted on the guide rail 41. The turning stand 4 of the applying robot 1 is supported on the slide 42.

The applying robot 1 is reciprocatingly movable between a work handing and transferring position M1 in which the slide 42 is allowed to advance toward the placing stand 40 and an applying position M2 in which the slide 42 is retreated away from the placing stand 40. As shown in FIG. 13, when the applying robot is in the work hanging and transferring position M1, the movable arm 6 can be reciprocatingly turned by the reciprocally turning movement of the movable arm 6 between a work carry-in position N1 and an applying position N2 deviated in phase by 90° from the work carry-in position N1.

The structure of the carry-out conveyer 14 is substantially the same as those shown in FIGS. 3 and 6, except that each tray $24_2$ is a flat plate. It should be noted that an expandable rod as described above is not mounted in the work carry-out position N3.

Posts $43_1$ and $43_2$ are raised outside the applying position N2 and the work carry-out position N3, respectively, and a guide rail 44 is horizontally laid on the upper end of each of the posts $43_1$ and $43_2$. The guide rail 44 is substantially parallel to the line on which the applying position N2 and the work carry-out position N3 are arranged. A work transfer machine 45 is mounted on the guide rail 44 in the following manner for reciprocating movement between the applying position N2 and the work carry-out position N3.

A lifting cylinder 46 of a hydraulic or pneumatic type or the like is supported on the guide rail 44 for linearly reciprocating movement with its axis turned substantially to a vertical direction and with a plurality of rolling wheels 47 mounted thereon being mated with the upper and lower edges of the guide rail 44. A work clamp mechanism 49 is attached to the lower end of a downwardly directed rod 48 and has a width smaller than the spacing between both of the endless belts $22_2$ of the carry-out conveyer 14. The clamp mechanism 49 comprises at least two hook-shaped opposed arms $50_1$ and $50_2$, and an actuator 51 for opening and closing the arms $50_1$ and $50_2$. The reason why one of the arms $50_1$ close to the applying robot is longer than the other arm $50_2$ is that because a work $16_2$ is placed, in an inclined state with its portion close to the applying robot 1 down, on the placing stand 40 in the applying position N2, the work $16_2$ can be reliably clamped.

The work $16_2$ has a sectional configuration substantially identical with those in the previous embodiments, as clearly shown in FIGS. 14 and 15.

The following is the description of an applying operation.

As shown in FIGS. 13 and 14, the lifting cylinder 46 of the work transfer machine 45 is moved to the above of the applying position N2 and operated to lift the clamp mechanism 49, and the actuator 51 is also operated to open the both arms $50_1$ and $50_2$. The applying robot 1 lies in the work hanging and transferring position M1 as a result of the advancing of the slide 42 toward the placing stand 40.

As shown in FIG. 13, an unapplied work $16_2$ is placed onto one set of opposed trays $24_1$, with its opposite ends being respectively on the trays, and then transported in a fallen-down state into the carry in position N1 by the work carry in conveyer 12. In the fallen-down state of the work $16_2$, the fore ends of the second bend portion 16b and the reinforcing portion 16c abut against the trays $24_1$.

When one work $16_2$ has reached the work carry in position N1, the carry in conveyer 12 is deactivated.

The work 16 is raised up in the above-described manner by the expandable rod and then, the movable arm 6 is turned to the work carry-in position N1 and expanded to hang the work $16_2$ by the hooks 21 of the hanger member 15.

The movable arm 6 is turned to the applying position N2, and the work $16_2$ is placed onto the placing stand 40 as shown in FIG. 14. In this placed state, the corner of the placing stand 40 engages the corner between the undersurface of the reinforcing portion 16c and the back surface b of the work $16_2$, and the first and second bend portions 16a and 16b protrude to the opposite sides of the placing stand 40, respectively.

The applying robot 1 reaches the applying position M2 as a result of retreating of the slide 42 away from the placing stand 40, and in that position M2, the applying treatment is conducted on the apply surface a of the work $16_2$ by the applying gun 9.

After the applying treatment, the clamp mechanism 49 is lowered by the lifting cylinder 46 of the work transfer machine 45, and the lower ends of the both arms $50_1$ and $50_2$ in the opened states are located respectively on the opposite sides of the work $16_2$ and then, the arms $50_1$ and $50_2$ are closed by the actuator 51 and brought into engagement with the first and second bend portions 16a and 16b to clamp the work $16_2$.

The work $16_2$ is lifted together with the clamp mechanism 49 by the lifting mechanism 46 of the work transfer machine 45 and then, the lifting cylinder 6 is moved along the guide rail 44 to the above of the work carry-out position N3, as shown by a solid line in FIG. 15. At this time, the carry-out conveyer 14 is deactivated, and one pair of trays $24_2$ are in the work carry-out position N3.

The clamp mechanism 49 in the lifted position is lowered by the lifting cylinder 46 of the work transfer machine 45 to place the work $16_2$ onto the two trays $24_2$ and both the arms $50_1$ and $50_2$ are opened by the actuator 51.

The applied work $16_2$ is transported from the work carry-out position N3 toward a drying furnace (not shown) by the carry-out conveyer 14.

On the other hand, the lifting cylinder 46 of the work transfer machine 45 is returned along the guide rail 44 to the above of the applying position N3. In addition, during transporting of the work, the applying robot 1 reaches the work hanging and transferring position M1, and the movable arm 6 is provided for the hanging and transferring of the next work $16_2$.

Figure 16:
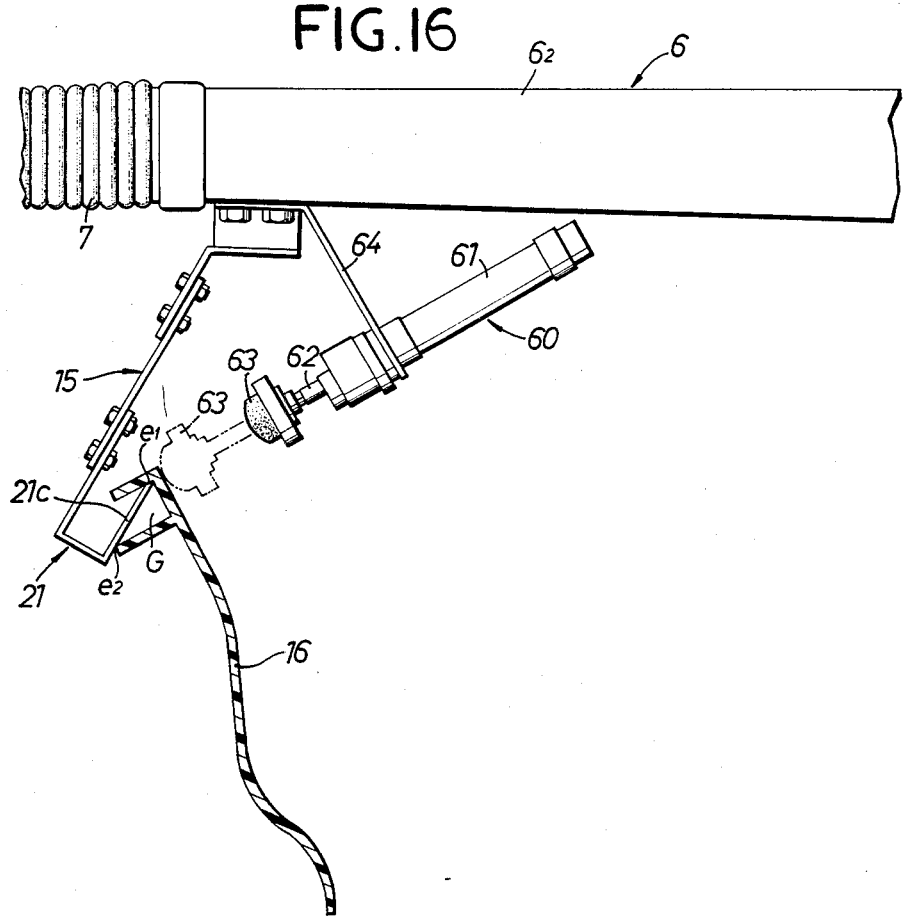
FIG. 16 is a fragmentary side view of an alternate applying robot.

FIG. 16 shows an urging member 60 for clamping a work 16 in cooperation with the hooks 21 of the hanging member i5. The urging member 60 includes a cylinder 61 of a hydraulic or pneumatic type or the like and an urger 63 mounted on the fore end of a piston rod of the cylinder 61. The cylinder 61 is attached to the undersurface of the front arm portion $6_2$ of the movable arm 6 through a support member 64, with the urger 63 opposed to the first engaging portion e1 of the leading portion 21c of the hook 21.

The urging member 60 is operated after the hanging of the work 16 by the hooks 21 to clamp the work 16 by the urger 63 thereof and the first engaging portion e1 and at the same time to urgingly maintain the engagement of the lower and inner surface of the groove G in the work 16 with the second engaging portion e2.

This enables the work to be further reliably prevented from falling off during the rapid movement of the movable arm 6.

Figure 17:
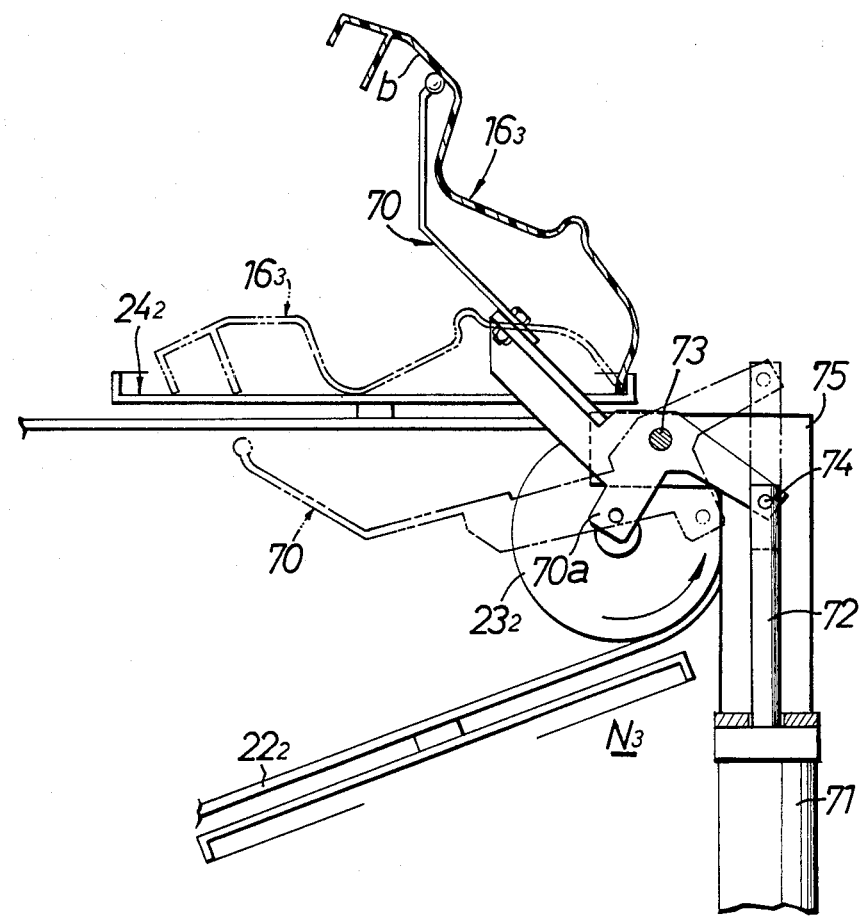
FIG. 17 is a front view illustrating another work placing operation in the work carry-out position.

FIG. 17 illustrates an alternate embodiment using a swingable arm as a second operating member for bringing the applied work from the raised-up state into the fallen-down state. A swinging cylinder 71 of a hydraulic or pneumatic type or the like is raised in the work carry-out position N3 with its piston rod 72 directed upwardly, and the intermediate portion of the swingable arm 70,70a is pivotally supported through a pin 73 on the fore end of a hook-shaped support member 75 mounted on the upper end of the cylinder 71. One end of the swingable arm 70,70a adapted to be opposed to the back surface b of a work $16_3$, and the other end of the swingable arm 70,70a is pivotally connected through a pin 74 to the fore end of the piston rod 72.

With the above arrangement, when the applied work $16_3$ is to be placed in the raised-up state onto one set of trays $24_2$ on the carry out conveyer 14, the swingable arm 70,70a is previously swung in the clockwise direction as shown by a solid line in FIG. 17 by the swinging cylinder 71, and thereafter, the swingable arm 70,70a is swung in the counter clockwise direction as shown by a broken line in FIG. 17 to place the work 16 in the fallen-down state onto the two trays $24_2$.

Alternatively, a swingable arm 70,70a described above may be also disposed in the work carry-in position N1. In addition, two or more swingable arms 70 may be interlockingly connected to one another, and in this case, a projection on the intermediate portion of the swingable arm 70 serves as a connection.

What is claimed is:

1. An applying robot comprising:
   a movable arm having an applying gun and reciprocatingly movable at least between a work carry-in position and an applying position;
   a work transporting hanger member mounted on said movable arm for picking up a work at said work carry-in position, transporting said work to said applying position and releasing said work at said applying position; and an urging member mounted on said movable arm for clamping said work in cooperation with said hanger member during transporting the work by said hanger member.

2. An applying robot according to claim 1, wherein said hanger member includes a hook.

3. An applying robot according to claim 2, wherein said hook includes a first engaging porting adapted to engage a corner defined between an upper inside surface and a bottom surface of a U-shaped groove provided along an upper edge of said work, and a second engaging portion adapted to engage a lower inside surface of said U-shaped groove.

4. An applying robot according to claim 1 or 2, wherein a movable wrist on a fore end of said movable arm includes a plurality of applying guns fixedly mounted thereon at respective predetermined mounting angles so that spraying directions of the guns are differentiated from each other, and said mounting angles are set such that with movement of said movable arm, the spraying direction of either one of said applying guns may be substantially normal to a desired application surface on the work with a minimum amount of movement of said movable wrist.

5. An applying robot according to claim 3, wherein a movable wrist on a fore end of said movable arm includes a plurality of applying guns fixedly mounted thereon at respective predetermined mounting angles so that spraying directions of the guns are differentiated from each other, and said mounting angles are set such that with movement of said movable arm, the spraying direction of either one of said applying guns can be substantially normal to a desired application surface on the work with a minimum amount of movement of said movable wrist.

6. An applying robot comprising:
a movable arm having an applying gun and reciprocatingly movable between a work carry-in position and an applying position as well as between said applying position and a work carry-out position;
a work transporting hanger member mounted on said movable arm for picking up a work at said work carry-in position, transporting said work to said applying position, releasing and re-engaging the work at the applying position, and transporting to and releasing said work at the work carrying-out position; and
an urging member mounted on said movable arm for clamping said work in cooperation with said hanger member during transporting the work by said hanger member.

7. An applying robot according to claim 6, wherein said hanger member includes a hook.

8. An applying robot according to claim 7, wherein said hook includes a first engaging portion adapted to engage a corner defined between an upper inside surface and a bottom surface of a U-shaped groove provided along an upper edge of said work, and a second engaging portion adapted to engage a lower inside surface of said U-shaped groove.

9. An applying robot according to claim 6 or 7, wherein a movable wrist on a fore end of said movable arm includes a plurality of applying guns fixedly mounted thereon at respective predetermined mounting angles so that spraying directions of the guns are differentiated from each other, and said mounting angles are set such that with movement of said movable arm, the spraying direction of either one of said applying guns can be substantially normal to a desired application surface on the work with a minimum amount of movement of said movable wrist.

10. An applying robot according to claim 8, wherein a movable wrist on a fore end of the said movable arm includes a plurality of applying guns fixedly mounted thereon at predetermined mounting angles so that spraying directions of the guns are differentiated from each other, and said mounting angles are set such that with movement of said movable arm, the spraying direction of either one of said applying guns can be substantially normal to a desired application surface on the work with a minimum amount of movement of said movable wrist.

11. An applying apparatus comprising:
a carry-in conveyer for transporting a work in a fallen-down state to a work carry-in position;
a first operating member disposed in said work carry-in position for raising up said work to a standing state after said work is transported on said carry-in conveyer to the carry-in position;
an applying robot having an applying gun and a hanger member for hanging and transferring said work in the standing state from said work carry-in position to an applying position and for hanging and transferring the work in the standing state from said applying position to a work carry-out position;
a carry-out conveyer for transporting said work from said work carry-out position; and
a second operating member disposed in said work carry-out position for maintaining said work in the standing state on said carry-out conveyer when said applying robot releases said work and for bringing said work into a fallen-down state onto said carry-out conveyer after the work has been released from the applying robot.

12. An applying apparatus according to claim 11, wherein each of said first and second operating members is an expandable rod.

13. An applying apparatus according to claim 11, wherein each of said first and second operating members is a swingable arm.

14. An applying apparatus comprising:
a carry-in conveyer for transporting an unapplied work to a work carry-in position;
a carry-out conveyer for transporting an applied work from a work carry-out position;
an applying robot having an applying gun and a hanger member and disposed between said work carry-in position and said work carry-out position, said robot being turnable between said work carry-in position and an applying position adjacent said work carry-in and carry-out positions to transfer said unapplied work from said work carry-in position to said applying position by means of said hanger member; and
a work transfer machine linearly movable between said applying position and said work carry-out position to transfer the applied work from said applying position to said work carry-out position.

* * * * *